US006683121B2

United States Patent
Chiou et al.

(10) Patent No.: US 6,683,121 B2
(45) Date of Patent: Jan. 27, 2004

(54) PIGMENT DISPERSANT COMPOSITION

(75) Inventors: Shang-Jaw Chiou, Lower Gwynedd, PA (US); Scott Lind Egolf, Lansdale, PA (US); Miao-Hsun Sheng, Lower Gwynedd, PA (US)

(73) Assignee: Rohm and Haas Company, Philadelphia, PA (US)

(*) Notice: Subject to any disclaimer, the term of this patent is extended or adjusted under 35 U.S.C. 154(b) by 67 days.

(21) Appl. No.: 09/990,036

(22) Filed: Nov. 20, 2001

(65) Prior Publication Data

US 2002/0099129 A1 Jul. 25, 2002

Related U.S. Application Data

(60) Provisional application No. 60/253,440, filed on Nov. 28, 2000.

(51) Int. Cl.$^7$ .............................................. C09D 11/10
(52) U.S. Cl. ..................... 523/161; 524/366; 524/505; 524/543; 524/824; 347/100; 106/31.28; 106/31.86; 526/317.1
(58) Field of Search .................. 523/161; 524/366, 524/505, 543, 824; 347/100; 106/31.28, 31.86; 526/317.1

(56) References Cited

U.S. PATENT DOCUMENTS

| 4,597,794 A | 7/1986 | Ohta et al. ................. 106/20 |
| 5,085,698 A | 2/1992 | Ma et al. ................... 106/20 |
| 5,130,369 A | 7/1992 | Hughes et al. ............. 524/846 |
| 5,172,133 A | * 12/1992 | Suga et al. ................ 347/100 |
| 5,211,747 A | 5/1993 | Breton et al. ............... 106/20 |
| 5,372,635 A | 12/1994 | Wasilewski et al. ....... 106/27 B |
| 5,529,617 A | 6/1996 | Yamashita et al. ........ 106/20 R |
| 5,889,083 A | * 3/1999 | Zhu ........................... 523/161 |
| 6,008,270 A | * 12/1999 | Santilli ...................... 523/161 |
| 6,162,860 A | 12/2000 | Anderson et al. .......... 524/507 |

FOREIGN PATENT DOCUMENTS

| EP | 0518490 B1 | 5/1992 |
| EP | 0780451 A2 | 12/1996 |

OTHER PUBLICATIONS

Raymond B. Seymour, Polymer Chemistry, an Introduction, Second Edition, Marcel Dekker, Inc., 1988, pp. 354–358.*

* cited by examiner

Primary Examiner—David W. Wu
Assistant Examiner—Satya Sastri
(74) Attorney, Agent, or Firm—Ronald D. Bakule

(57) ABSTRACT

A pigment dispersant including 80–97% by weight, based on the weight of the pigment dispersant, of a first polymer comprising as copolymerized units 15–75% by weight, based on the first polymer weight, ethylenically unsaturated carboxylic acid-functional monomer, the polymer having a Mw from 4,000 to 16,000, and the polymer having a Tg greater than 70° C.; and 3–20% by weight, based on the weight of the pigment dispersant, of a poly(ethylene oxide/propylene oxide) block second polymer having an Mw from 3,000 to 20,000 and an HLB value of 16 to 32 is provided. And the invention relates to a method for dispersing a pigment in an aqueous medium using the pigment dispersant, an aqueous pigment dispersion including the pigment dispersant, and an aqueous ink including the pigment dispersion.

4 Claims, No Drawings

PIGMENT DISPERSANT COMPOSITION

CROSS REFERENCE TO RELATED PATENT APPLICATIONS

This is a non-provisional application of prior pending U.S. provisional application serial No. 60/253,440 filed Nov. 28, 2000.

This invention relates to a pigment dispersant, particularly to a pigment dispersant including a carboxylic acid-functional first polymer and a poly(ethylene oxide/propylene oxide) block second polymer. Also the invention relates to a method for dispersing a pigment in an aqueous medium using the pigment dispersant, an aqueous pigment dispersion including the pigment dispersant, and an aqueous ink including the pigment dispersion.

Pigment is suspended in an aqueous medium along with a pigment dispersant and subjected to input mechanical energy, commonly called milling or grinding the pigment, in order to form a pigment dispersion. A pigment dispersant capable of facilitating the formation of a variety of pigments to provide stable pigment dispersions in which the pigment is provided substantially at the primary particle size of the pigment with the highest pigment loading possible at a desired viscosity is sought.

U.S. Pat. No. 6,008,270 discloses ink jet inks containing block copolymers of polyethylene oxide and polypropylene oxide; it is further disclosed that the block copolymers may be added to the mill grind.

U.S. Pat. No. 5,172,133 discloses an ink comprising a water-soluble resin and a liquid medium; the water-soluble resin contained as a dispersing agent for the pigment preferably has a weight average molecular weight from 3,000 to 30,000 and may contain copolymerized carboxylic acid monomer.

Nonetheless, improved pigment dispersants are still desired in order to provide pigment dispersions having a higher pigment loading at a given viscosity and/or exhibiting increased pigment dispersion viscosity stability, preferably exhibiting compatibility with ink letdown vehicles and formulation components.

It has now been surprisingly found that pigment dispersants including certain carboxylic acid-functional first polymers and certain poly(ethylene oxide/propylene oxide) block second polymers in a selected ratio provide improved pigment dispersion properties which are also of benefit in inks formed therefrom.

In a first aspect of the present invention there is provided a pigment dispersant including 80–97% by weight, based on the weight of the pigment dispersant, of a first polymer including as copolymerized units 15–75% by weight, based on the first polymer weight, ethylenically unsaturated carboxylic acid-functional monomer, the polymer having a Mw from 4,000 to 16,000, and the polymer having a Tg greater than 70° C.; and 3–20% by weight, based on the weight of the pigment dispersant, of a poly(ethylene oxide/propylene oxide) block second polymer having an Mw from 3,000 to 20,000 and an HLB value of 16 to 2.

In a second aspect of the present invention there is provided a method for dispersing a pigment in an aqueous medium including admixing an aqueous medium; a pigment; and 1–50% by weight, based on dry pigment weight, of the pigment dispersant of the present invention and subjecting the admixture to shear for a time sufficient to disperse the pigment.

In a third aspect of the present invention there is provided a pigment dispersion including a pigment dispersed in an aqueous medium and 1–50% by weight, based on dry pigment weight, of the pigment dispersant of the present invention.

In a fourth aspect of the present invention there is provided an aqueous ink including the pigment dispersion of the present invention.

The pigment dispersant of the present invention includes 80–97% by weight, based on the weight of the pigment dispersant, of a first polymer including as copolymerized units 15–75% by weight, based on the first polymer weight, ethylenically unsaturated carboxylic acid functional monomer, the polymer having a Mw from 4,000 to 16,000, and the polymer having a Tg greater than 70° C. The first polymer includes as copolymerized units 15–75%, preferably 20–55%, by weight, based on the first polymer weight, ethylenically unsaturated carboxylic acid-functional monomer such as, for example, (meth)acrylic acid, crotonic acid, itaconic acid, fumaric acid, maleic acid, monomethyl itaconate, monomethyl fumarate, monobutyl fumarate, and maleic anhydride. A preferred first polymer includes as copolymerized units 25–40%, by weight, based on the first polymer weight, acrylic acid.

The first polymer further includes, as copolymerized unit(s), at least one monoethylenically-unsaturated monomer in addition to the carboxylic acid-functional monomer such as, for example, methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate, aminoalkyl (meth)acrylate, N-alkyl aminoalkyl (methacrylate), N,N-dialkyl aminoalkyl (meth) acrylate; urieido (meth)acrylate; (meth)acrylonitrile and (meth)acrylamide; styrene, α-methylstyrene, or other alkyl-substituted styrenes; butadiene; vinyl acetate, vinyl propionate, or other vinyl esters; vinyl monomers such as vinyl chloride, vinylidene chloride, and N-vinyl pyrrolidone. The use of the term "(meth)" followed by another term such as acrylate, acrylonitrile, or acrylamide, as used throughout the disclosure, refers to both acrylate, acrylonitrile, or acrylamide. Preferred as monoethylenically-unsaturated monomer in addition to the carboxylic acid-functional monomer is a combination of styrene and α-methylstyrene.

The first polymer has a Mw from 4,000 to 16,000, and the polymer has a Tg greater than 70° C. Mw as reported herein is weight average molecular weight as determined by Gel Permeation chromatography measured vs. polystyrene standards.

The glass transition temperature ("Tg") of the first polymer is greater than 70° C., the monomers and amounts of the monomers selected to achieve the desired polymer Tg range are well known in the art. Tgs used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(calc.) = w(M1)/Tg(M1) + w(M2)/Tg(M2), \text{ wherein}$$

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers may be found, for example, in "Polymer Handbook", edited by J. Brandrup and E. H. Immergut, Interscience Publishers.

The free radical addition polymerization techniques used to prepare the first polymer of the pigment dispersant of this invention are well known in the art. Preferred are polymerization in concentrated solution or in bulk, preferably by a semi-continuous or a continuous process using, for example, a plug flow reactor, a CFSTR, or a hot tube reactor. Free-radical generating initiator compounds such as peroxides and hydroperoxides may be used at a level of 0–5% by weight based on total monomer weight. The monomer mixture may be added uniformly as to rate or composition. The reaction temperature is maintained at a temperature between 100° C. and 500° C. for a residence time of 1–30 minutes. Preferred is a reaction temperature between 150° C. and 240° C. for a residence time of 2.5–10 minutes.

The pigment dispersant of the present invention also includes 3–20% by weight, based on the weight of the pigment dispersant, of a poly(ethylene oxide/propylene oxide) block second polymer having an Mw from 3,000 to 20,000 and an HLB value of 16 to 32. Typically the block copolymers are solids at 25° C. The poly(ethylene oxide/propylene oxide) block copolymer includes two or more blocks, each block being composed of polyethylene oxide or polypropylene oxide. The poly(ethylene oxide/propylene oxide) block polymers may be prepared by methods known in the art and may be mono- or di-hydroxy terminated. For example, a polyethylene oxide polymer may be reacted with propylene oxide to form a poly(propylene oxide/ethylene oxide/propylene oxide) triblock polymer. Alternatively, a polypropylene oxide polymer may be reacted with ethylene oxide to form a poly(ethylene oxide/propylene oxide/ethylene oxide) triblock polymer. Many such compositions are commercially available from BASF Corporation under the PLURONIC™ trademark.

The pigment dispersant of the present invention includes 80–97% by weight, based on the weight of the pigment dispersant, of a first polymer as described hereinabove and 3–20% by weight, based on the weight of the pigment dispersant, poly(ethylene oxide/propylene oxide) block second polymer as described hereinabove. The first and second polymer are typically formed separately and admixed to provide the pigment dispersant. One or both of the first and second polymer may be in the form of a solution, preferably a solution in an aqueous medium, at the time of admixing, whether formed directly in that solution or subsequently dissolved. Alternatively, the first and second polymer may both be solids and be ground together or mixed together to form the pigment dispersant.

In the second aspect of the present invention there is provided a method for dispersing a pigment in an aqueous medium including admixing an aqueous medium; a pigment; and 1–50% by weight, based on dry pigment weight, of the pigment dispersant of the present invention and subjecting the admixture to shear for a time sufficient to disperse the pigment. By an "aqueous medium" herein is meant water or an homogeneous mixture which is predominantly water but which also contains amounts of water miscible solvent(s) such as, for example, alcohols, glycols, glycol ethers, glycol esters, and the like. The pigment may be at least one organic or inorganic pigment, a pigment composite, or mixtures thereof. The admixture includes 1–50%, preferably 8–25%, by weight, based on dry pigment weight, of the pigment dispersant of the present invention. The admixture is then subjected to shearing in a grinding or milling device as is well known in the pigment dispersion art. Such grinding or milling devices include roller mills, ball mills, bead mills, attrittor mills and include mills in which the admixture is continuously recirculated. The shearing of the admixture is continued for a time sufficient to disperse the pigment by which is meant herein that the objective of reducing the pigment to its primary particle size to maximize stability and color development is typically balanced against the cost in time and energy required to achieve the ultimate extent of dispersion. The time sufficient to disperse the pigment is typically dependent on the nature of the pigment and pigment dispersant and the grinding or milling device which is used and will be determined by the skilled practitioner.

The pigment dispersion which results from the method for dispersing a pigment is typically provided at 35–50% pigment, by weight, based on the weight of the pigment dispersion. The pigment dispersion is desirably stable to settling and viscosity change; long-term stability is simulated by heat-aging the dispersion at 49° C. (120° F.) for periods up to one month. The pigment dispersion may also include additional ingredients such as waxes, defoamers, biocides, and the like.

The pigment dispersion of this invention may be used in inks, paints, paper coatings, leather coatings, adhesives, and the like. In preferred aspect of the present invention an ink, such as, for example, an aqueous flexographic ink, may be prepared from the pigment dispersion by diluting the pigment dispersion and optionally admixing conventional ink ingredients such as waxes, defoamers, binder resins, thickeners, humectants, biocides, and the like.

The following examples are presented to illustrate the invention and the results obtained by the test procedures.

EXAMPLE 1

Preparation of First Polymer in a Hot Tube Reactor

A 29 foot long section of SS tubing having an inner diameter of $\frac{1}{8}^{th}$ inch was connected at one end to a high pressure pump (Thermoseparation Model ConstraMetric 3200) and at another end to a back-pressure control device. Between the two ends, the section of tubing was coiled and situated inside an oven. The oven was equipped with a temperature probe which was connected to a temperature controlling device. The temperature controlling device regulated the heat imparted to the coiled tubing. A heat exchanger was equipped to remove the heat before sample was collected. A second SS tubing to deliver dilution solvent was installed. One end of the second tubing with an inner diameter of $\frac{1}{16}^{th}$ inch was connected to the first tubing before the heat exchanger. The other end was connected to a high pressure pump (Thermoseparation Model Constra-Metric 3200).

The reaction mixture was an 86% by weight Dowanol DPM solution of styrene, alpha methyl styrene, and glacial acrylic acid and 1.5 percent by weight based on the weight of monomers of tert-butyl peroxybenzoate. The flow rate was adjusted to provide a residence time of 4 minutes. The polymerization composition, temperature, percent conversion of monomer to polymer, Mw and Mn are presented in Table 1.1.

Acetone was pumped through the larger tubing via the high pressure pump at a rate from 1 to 20 ml/min. The pressure was maintained at a level of from 500 to 2000 psi. The oven was heated to the desired polymerization temperature. After 15 minutes, the acetone being pumped through the tubing was replaced by the reaction mixture which was continuously pumped through the tubing at a constant rate.

At the same time, the dilution solvent was pumped through the smaller second tubing at a rate of 0.5 to 20 ml/min to dilute the polymer before it was cooled down. After allowing a suitable amount of time for the acetone to be cleared from the tubing, product was collected as the effluent from the back-pressure control device. When the reaction mixture was nearly gone, acetone was pumped through the tubing at the same rate and temperature as the reaction mixture.

The first polymer was isolated using a wiped-film-evaporator to remove volatile materials. The polymer was dissolved in an aqueous ammonia solution.

TABLE 1.1

Composition and Characterization of Examples 1–2

| Example | Styrene % | AMS % | AA % | Polymer Solids (wt %) | Mw | Mn |
|---|---|---|---|---|---|---|
| 1 | 40 | 30 | 30 | 29.6 | 9737 | 3843 |
| 2 | 40 | 30 | 30 | 31.4 | 6565 | 3240 |

EXAMPLE 3

Preparation of First Polymer in a Resin Kettle

A 2 liter, four-necked resin kettle equipped with a mechanical stirrer, nitrogen sparge, thermocouple, and condenser was charged with 8 g DOWNOL DPM and 8 g oleic acid, 32 g styrene, 24 g α-methylstyrene, 24 g glacial acrylic acid and 0.32 g t-butyl peroxybenzoate. The mixture was heated to 180° C. Ten minutes after the temperature reached 180° C., a monomer mixture containing 128 g styrene, 96 g α-methylstyrene, 96 g glacial acrylic acid, and 1.28 g t-butyl peroxybenzoate were fed over a period of two hours at 180° C. After completion of the feed, the reaction mixture was held for 30 minutes at 180° C. and then was pour into an aluminum dish. The resulting polymer was ground and dissolved in an aqueous alkali mixture.

TABLE 3.1

Composition and Characterization of Example 3

| Example | Styrene % | AMS % | AA % | Polymer Solids (wt %) | Mw | Mn |
|---|---|---|---|---|---|---|
| 3 | 40 | 30 | 30 | 30.6 | 9436 | 2246 |

EXAMPLES 4

Preparation of Pigment Dispersant From Blend of Solid Polymers 200 g of first polymer was ground with 20 g ethylene oxide and propylene oxide block second polymer (BASF Corporation). The resulting powder was dissolved in a aqueous alkali mixture to make a solution at the solids and pH presented in Table 4.1.

TABLE 4.1

Pigment Dispersant Compositions

| Example | First Polymer | Block Polymer | First Polymer Mw | Solids wt. % | pH |
|---|---|---|---|---|---|
| 4 | Morez ™ 101 | Pluronic ™ F-98 | 7018 | 32.0 | 9.2 |
| 5 | Morez ™ 101 | Pluronic ™ F-127 | 7414 | 30.5 | 9.3 |

EXAMPLES 6–8 and COMPARATIVE EXAMPLE A–B

Preparation and Evaluation of Pigment Dispersions

Pigment dispersions of CDR 57DT688 (CDR Pigments) Lithol Rubine 57:1 pigment were prepared by adding:

| Example | Component | Parts by weight |
|---|---|---|
| Comp. A | CDR 57DT688 (100%) | 40.00 |
| | First Polymer (Example 1; 29.6%) | 22.55 |
| | Water | 36.95 |
| | PI-35 defoamer (Ultra Adhesives) | 0.50 |
| | | 100.0 |
| Comp. B | CDR 57DT688 (100%) | 40.00 |
| | First Polymer (Example 1; 29.6%) | 22.00 |
| | Pluronic F-98 (100%) | 0.16 |
| | Water | 37.34 |
| | PI-35 defoamer (Ultra Adhesives) | 0.50 |
| | | 100.0 |
| 6 | CDR 57DT688 (100%) | 40.00 |
| | First Polymer (Example 1, 29.6%) | 20.50 |
| | Pluronic F-98 (100%) | 0.61 |
| | Water | 38.39 |
| | PI-35 defoamer (Ultra Adhesives) | 0.50 |
| | | 100.0 |
| 7 | CDR 57DT688 (100%) | 40.00 |
| | First Polymer (Example 1, 29.6%) | 20.50 |
| | Pluronic F-38 (100%) | 0.61 |
| | Water | 38.39 |
| | PI-35 defoamer (Ultra Adhesives) | 0.50 |
| | | 100.0 |
| 8 | CDR 57DT688 (100%) | 40.00 |
| | First Polymer (Example 1, 29.6%) | 20.50 |
| | Pluronic F-127 (100%) | 0.61 |
| | Water | 38.39 |
| | PI-35 defoamer (Ultra Adhesives) | 0.50 |
| | | 100.0 |

Dispersion pH was adjusted to 9.0 with $NH_4OH$. The mixture was pre-dispersed at moderate speed for 20 minutes using a Dispersator (Premier Mill) and then milled on an Eiger Mini Motormill 250 (Eiger Machinery) for 20 minutes at 4000 rpm. Particle size was measured with a NAPIRI gauge. Viscosity of the pigment dispersion was measured on a Brookfield DV-I+ viscometer using spindles #1–4 at 60 rpm. Results are presented in Table 6.1

TABLE 6.1

Viscosity Stability of pigment dispersions

| | | Ambient-aged Brookfield Viscosity (cPs) | | 120° F. Heat-aged Brookfield Viscosity (cPs) | |
|---|---|---|---|---|---|
| Example | NAPIRI Gauge (µm) | Initial | 1 month | 2 weeks | 1 month |
| Comp. A | <1 | 79 | 89 | 101 | 1710 |
| Comp. B | <1 | 70 | 102 | 83 | >10000 |
| 6 | <1 | 93 | 95 | 115 | 530 |
| 7 | <1 | 93 | 101 | 100 | 540 |
| 8 | <1 | 75 | 86 | 150 | 484 |

The dispersions were subjected to a shocking test by adding 2.0 g of dispersion dropwise into 50 g of Lucidene™ 395 latex without stirring and allowing the mixture to remain static for 1 minute. After 1 minute, the mixture was very slowly stirred and observed for agglomeration of the pigment particles. Results are presented in Table 6.2

TABLE 6.2

Shock stability of pigment dispersions

| Example | Shock Test Result, Visual Density of Agglomerates Formed | Resistance to Shocking Rating |
| --- | --- | --- |
| Comp. A | Low–medium | Fair |
| Comp. B | Low | Fair–good |
| 6 | None | Excellent |
| 7 | Low | Fair–good |
| 8 | Trace | V. good |

Inks were prepared containing 39.2 wt % of the pigment dispersion, 5–10% water, and 50–55% Lucidene™ 395 latex. The viscosity of each ink was adjusted to a #2 Zahn cup viscosity of 27–29 seconds and the total weight of ink solids was between 41–44%. The inks were transferred side by side onto Leneta Form WB using a 550 anilox cells per inch Pamarco handproofer and dried at 81° C. for 2 minutes. The coated sheets were equilibrated at 23° C. and 50% relative humidity for 24 hours prior to measuring color density with a X-RITE B-318 color densitometer and 60° gloss with a BYK Labotron Gloss Unit. Results are presented in Table 6.3

TABLE 6.3

Ink Color Density and Gloss Evaluation

| | Ink | Handproofed Coating using 550 Anilox | | |
| --- | --- | --- | --- | --- |
| Example | Viscosity (sec.) | Color Density | Visual Color | 60° Gloss (%) |
| Comp. A | 27 | 1.61 | Good | 75.7 |
| 6 | 29 | 1.70 | Excellent | 78.2 |
| 8 | 28 | 1.65 | V. good | 79.2 |

A tint of the dispersion was prepared by adding 1.0 g of the dispersion into 50.0 g of white paint base (ACE 183A 100 Royal Touch Flat White Latex Wall Paint) and thoroughly mixing for 20 minutes on a paint shaker. The tints were coated side by side onto Leneta Form WB using a #30 wire-wound rod and dried at 81° C. for 2 minutes. The coated sheets were equilibrated at 23° C. and 50% relative humidity for 24 hours prior to measuring color strength with a BYK-Gardner Spectrophotometer, Color Sphere Model, D-65 daylight source, CIE L*a*b* color space, 10° observer, specular component included, and a sample measurement area of 30 mm. Results are presented in Table 6.4

TABLE 6.4

Evaluation of Tint Strength

| | | BYK-Gardner Spectrophotometer Tint Strength | |
| --- | --- | --- | --- |
| Example | Visual Tint Strength | % Strength Over all Wavelengths | % Strength at max. Absorption (560 nm) |
| Comp. A | Good | 97.03 | 96.01 |
| Comp. B | Good | 96.46 | 95.42 |
| 6 | V. good-excellent | 101.73 | 100.54 |

TABLE 6.4-continued

Evaluation of Tint Strength

| | | BYK-Gardner Spectrophotometer Tint Strength | |
| --- | --- | --- | --- |
| Example | Visual Tint Strength | % Strength Over all Wavelengths | % Strength at max. Absorption (560 nm) |
| 7 | V. good | 97.43 | 96.18 |
| 8 | Excellent | 100.80 | 99.29 |

Examples 6–8, pigment dispersions of the invention, exhibit superior viscosity stability, equal to better shock resistance, superior ink color intensity and printed gloss, and superior tint strength relative to Comparative Examples A–B.

EXAMPLE 9 and COMPARATIVE EXAMPLE C–D

Preparation and Evaluation Dispersions of Carbon Black

| Example | Component | Parts by weight |
| --- | --- | --- |
| Comp. C | Elftex ™ 8 (100%) (Cabot Corp.) | 30.00 |
| | First Polymer (Example 3, 30.6%) | 16.35 |
| | Water | 53.15 |
| | PI-35 defoamer (Ultra Adhesives) | 0.50 |
| | | 100.0 |
| Comp. D | Elftex ™ 8 (100%) | 30.00 |
| | First Polymer (Example 3, 30.6%) | 14.86 |
| | Pluronic ™ L31 (HLB = 5) | 0.45 |
| | Water | 54.19 |
| | PI-35 defoamer (Ultra Adhesives) | 0.50 |
| | | 100.0 |
| 9 | Elftex ™ 8 (100%) | 30.00 |
| | First Polymer (Example 3, 30.6%) | 14.86 |
| | Pluronic ™ F-127 (HLB = 22) | 0.45 |
| | Water | 54.19 |
| | PI-35 defoamer (Ultra Adhesives) | 0.50 |
| | | 100.0 |

The mixtures above were adjusted to 9.0 with $NH_4OH$. Each mixture was pre-dispersed at moderate speed for 20 minutes using a Dispersator (Premier Mill) and then milled on an Eiger Mini Motormill 250 (Eiger Machinery) for 20 minutes at 4000 rpm. Particle size was measured with a NAPIRI gauge. Viscosity of the pigment dispersion was measured on a Brookfield DV-I+ viscometer using spindles #1–4 at 60 rpm.

TABLE 9.1

Viscosity Stability

| | | 120° F. Heat-aged Brookfield Viscosity (cPs) | | |
| --- | --- | --- | --- | --- |
| Example | NAPIRI Gauge (μm) | Initial | 1 week | 1 month |
| Comp. C | <1 | 340 | 354 | 342 |
| Comp. D | <1 | 360 | 346 | 356 |
| 9 | <1 | 44 | 44 | 44 |

Inks were prepared by mixing together 15.0 g pigment dispersion, 10.0 g water, and 20.0 g of Lucidene™ 395 latex with moderate stirring. The inks were allowed to age for 23 days at 23° C. and were observed for settling or separation. The inks were coated on Leneta 3NT-3 coated paper using a #6 wire-wound rod and dried at 81° C. for 2 minutes in a forced air oven. The coated sheets were equilibrated at 23° C. and 50% relative humidity for 24 hours prior to measuring optical density with a X-RITE B-318 color densitometer and 75° gloss with a Technidyne 75° gloss meter.

TABLE 9.2

Evaluation of Ink Stability, Color Development, and Printed Gloss

| Example | Ink Separation (% by volume) | Coating Optical Density | Coating 75° Gloss (%) |
|---|---|---|---|
| Comp. C | 33 | 1.95 | 54.0 |
| Comp. D | 31 | 1.97 | 51.5 |
| 9 | 0 | 2.01 | 53.5 |

Pigment dispersions of Example 9 of the invention provided superior dispersion and ink stability and ink properties compared to Comparative Examples C–D.

EXAMPLES 10–13

Preparation and Evaluation of Pigment Dispersions

Pigment dispersions of CDR 57DT688 (CDR Pigments) Lithol Rubine 57:1 pigment were prepared with the following ingredients.

| Example | Component | Parts by weight |
|---|---|---|
| 10 | CDR 57DT688 (100%) | 40.00 |
|  | Pigment Dispersant (Ex. 4, 32.0%) | 31.21 |
|  | Water | 28.29 |
|  | PI-35 defoamer (Ultra Adhesives) | 0.50 |
|  |  | 100.0 |
|  | Pigment/Dispersant = | 4/1 |
| 11 | CDR 57DT688 (100%) | 40.00 |
|  | Pigment Dispersant (Ex. 4, 32.0%) | 20.81 |
|  | Water | 38.69 |
|  | PI-35 defoamer (Ultra Adhesives) | 0.50 |
|  |  | 100.0 |
|  | Pigment/Dispersant = | 6/1 |
| 12 | CDR 57DT688 (100%) | 40.00 |
|  | Pigment Dispersant (Ex. 5, 30.5%) | 32.75 |
|  | Water | 26.75 |
|  | PI-35 defoamer (Ultra Adhesives) | 0.50 |
|  |  | 100.0 |
|  | Pigment/Dispersant = | 4/1 |
| 13 | CDR 57DT688 (100%) | 40.00 |
|  | Pigment Dispersant (Ex. 5, 30.5%) | 21.84 |
|  | Water | 37.66 |
|  | PI-35 defoamer (Ultra Adhesives) | 0.50 |
|  |  | 100.0 |

The mixtures were adjusted to pH=9.0 with NH$_4$OH and milled according to the method of Example 6. In these examples the solid form of the pigment dispersant which was dissolved in ammoniated water to provide a solution was used. Particle size was measured by diluting the dispersion with water and analyzing with a BI-90 Particle Sizer (Brookhaven Instruments).

TABLE 10.1

Viscosity Stability of Pigment Dispersions

| Example | Particle Size (nm) | Ambient-aged Brookfield Viscosity (cPs) | | 120° F. Heat-aged Brookfield Viscosity (cPs) | |
|---|---|---|---|---|---|
|  |  | Initial | 1 month | 2 weeks | 1 month |
| 10 | 152 | 162 | 225 | 665 | 3010 |
| 11 | 160 | 59 | — | 179 | 3500 |
| 12 | 156 | 153 | 217 | 565 | 2760 |
| 13 | 162 | 61 | 76 | 289 | 3320 |

Inks were prepared with dispersions 10–13 according to previous methods and contained 6–14% water, 47–55% Lucidene™ 395 latex, and 39.2 wt. % dispersion.

TABLE 10.2

Evaluation of Ink Properties

| Example | Total Ink Solids (%) | #2 Zahn Viscosity (sec.) | Color Density | Handproofed Coating using 550 Anilox Visual Color Strength | 60° Gloss (%) |
|---|---|---|---|---|---|
| 10 | 43.3 | 28 | 1.76 | Excellent | 80.7 |
| 11 | 43.1 | 27 | 1.81 | Excellent | 79.2 |
| 12 | 43.2 | 28 | 1.77 | Excellent | 81.1 |
| 13 | 43.0 | 28 | 1.79 | Excellent | 79.4 |

Pigment dispersions of Examples 10–13 exhibited useful levels of dispersion stability and inks made therefrom provided increased ink solids at equivalent viscosity and excellent color strength.

COMPARATIVE EXAMPLE E

Preparation of Pigment Dispersion With Only Poly (ethylene Oxide/polypropylene Oxide) Block Polymer as Dispersant A dispersion of CDR-57DT688 (CDR Pigments) Lithol Rubine 57:1 pigment was prepared by adding:

| Component | Parts by weight |
|---|---|
| CDR 57DT688 (100%) | 40.00 |
| Pluronic ™ F-98 (100%) | 10.00 |
| Water | 49.50 |
| PI-35 defoamer (Ultra Adhesives) | 0.50 |
|  | 100.0 |
| Pigment/Dispersant = | 4/1 |

The mixture pH was adjusted to 9.0 with NH$_4$OH. The mixture was pre-dispersed at moderate speed for 20 minutes using a Dispersator (Premier Mill) and then milled on an Eiger Mini Motormill 250 (Eiger Machinery) for 5 minutes at 4000 rpm, at which point the dispersion started to thicken and ceased to flow properly in the mill. Further milling of the dispersion was discontinued.

EXAMPLE 14.

Preparation and Evaluation of Dispersions of Various Pigments

Pigment dispersions of Sun 249-1282 Green, Sun 474-4454 Yellow, Sun 246-1670 Violet, and Regal 660 Carbon Black with a pigment dispersant which was composed of 91% by wt. first polymer of Example 2 and 9% by st. Pluronic F-98 were carried out, inks prepared and evaluated according to the methods of Example 6.

Inks were prepared with the above dispersions according to the method of Example 6. Results are presented in Table 14.2

TABLE 14.1

Viscosity stability

| Regal Black 660 Wt. % Pigment Loading | Pigment Dispersant Ratio | Dispersion Ambient (25° C.) Brookfield Viscosity (cPs) DVI @ 60 rpm/spindle #1–4 | | Dispersion Heat Aged (120° F.) Brookfield Viscosity (cPs) DVI @ 60 rpm/spindle #1–4 | |
|---|---|---|---|---|---|
| | | Initial | 5 days | 1 week | 2 weeks |
| 40 | 6/1 | 580 | 620 | 320 | 340 |
| 40 | 4/1 | 640 | 600 | 620 | 640 |

| Sun Violet 246–1670 Wt. % Pigment Loading | Pigment to Dispersant Ratio | Dispersion Ambient (25° C.) Brookfield Viscosity (cPs) DVI @ 60 rpm/spindle #1–4 | | Dispersion Heat Aged (120° F.) Brookfield Viscosity (cPs) DVI @ 60 rpm/spindle #1–4 | |
|---|---|---|---|---|---|
| | | Initial | 5 days | 1 week | 2 weeks |
| 40 | 6/1 | 140 | 140 | 120 | 120 |
| 40 | 4/1 | 140 | 150 | 150 | 150 |

| Sun Green 249–1282 Wt. % Pigment Loading | Pigment Dispersant Ratio | Dispersion Ambient (25° C.) Brookfield Viscosity (cPs) DVI @ 60 rpm/spindle #1–4 | | Dispersion Heat Aged (120° F.) Brookfield Viscosity (cPs) DVI @ 60 rpm/spindle #1–4 | |
|---|---|---|---|---|---|
| | | Initial | 1 month | 2 weeks | 1 month |
| 40 | 6/1 | 42 | 45 | 42 | 108 |
| 40 | 4/1 | 60 | 55 | 72 | 125 |

| Sun Yellow 474–4454 Wt. % Pigment Loading | Pigment Dispersant Ratio | Dispersion Ambient (25° C.) Brookfield Viscosity (cPs) DVI @ 60 rpm/spindle #1–4 | | Dispersion Heat Aged (120° F.) Brookfield Viscosity (cPs) DVI @ 60 rpm/spindle #1–4 | |
|---|---|---|---|---|---|
| | | Initial | 1 month | 2 weeks | 1 month |
| 36.3 | 6/1 | 32 | 35 | 41 | 40 |
| 33.1 | 4/1 | 110 | 220 | 172 | 255 |

TABLE 14.2

Evaluation of Inks

| Regal Black 660 Wt. % Pigment Loading | Pigment Dispersant Ratio | Wt. % Ink Solids | Ink Viscosity #2 Zahn (sec) | 550 Anilox Transferred Visual Color Strength Rating | 60 Degree Ink Gloss (%) |
|---|---|---|---|---|---|
| 40 | 6/1 | 39.5 | 27.0 | V. good | 46.0 |
| 40 | 4/1 | 42.1 | 28.0 | Excellent | 39.0 |

| Sun Violet 246–1670 Wt. % Pigment Loading | Pigment to Dispersant Ratio | Wt. % Ink Solids | Ink Viscosity #2 Zahn (sec) | Visual Color Strength Rating | 60 Degree Ink Gloss (%) |
|---|---|---|---|---|---|
| 40 | 6/1 | 42.1 | 26.0 | Excellent | 47.0 |
| 40 | 4/1 | 43.1 | 27.0 | Excellent | 42.0 |

| Sun Green 249–1282 Wt. % Pigment Loading | Pigment Dispersant Ratio | Wt. % Ink Solids | Ink Viscosity #2 Zahn (sec) | Visual Color Strength Rating | 60 Degree Ink Gloss (%) |
|---|---|---|---|---|---|
| 40 | 6/1 | 45.9 | 25.0 | Excellent | 59.9 |
| 40 | 4/1 | 46.7 | 26.0 | Excellent | 65.8 |

| Sun Yellow 474–4454 Wt. % Pigment Loading | Pigment Dispersant Ratio | Wt. % Ink Solids | Ink Viscosity #2 Zahn (sec) | Visual Color Strength Rating | 60 Degree Ink Gloss (%) |
|---|---|---|---|---|---|
| 36.3 | 6/1 | 43.8 | 22.0 | Excellent | 74.4 |
| 33.1 | 4/1 | 42.8 | 24.0 | Excellent | 78.0 |

The dispersions of this Example were also evaluated for shock resistance and tinting strength in a white paint base according to the methods of Example 6. Results are presented in Table 14.3

TABLE 14.3

Shock Resistance and Tinting Strength

| Regal Black 660 Wt. % Pigment Loading | Pigment/ Dispersant Ratio | Shock Resistance With Lucidene ™ 395 Rating | Density of flocs | Tinting Strength Visual Rating | % Tint Strength Over All Wavelengths | % Tint Strength at max. abs. of 440 nm. |
|---|---|---|---|---|---|---|
| 40 | 6/1 | Good | Low | Excellent | 99.8 | 99.2 |
| 40 | 4/1 | Good | Low | Excellent | 102.1 | 101.8 |

TABLE 14.3-continued

Shock Resistance and Tinting Strength

| Sun Violet 246–1670 Wt. % | Pigment/ Dispersant Ratio | Shock Resistance With Lucidene ™ 395 | | Tinting Strength | | % Color Strength |
|---|---|---|---|---|---|---|
| Pigment Loading | Dispersant Ratio | Rating | Density of flocs | Visual Rating | % App. Str. | at max. abs. of 440 nm. |
| 40 | 6/1 | Good | Low | Good | 93.9 | 92.6 |
| 40 | 4/1 | Good | Low | Good | 93.3 | 91.9 |

| Sun Green 249–1282 Wt. % | Pigment/ | Shock Resistance With Lucidene ™ 395 | | Tinting Strength | | % Color Strength |
|---|---|---|---|---|---|---|
| Pigment Loading | Dispersant Ratio | Rating | Density of flocs | Visual Rating | % App. Str. | at max. abs. of 630 nm. |
| 40 | 6/1 | Exc. | None | Good | 92.6 | 92.4 |
| 40 | 4/1 | Exc. | None | Very Good | 95.7 | 95.2 |

| Sun Yellow 474–4454 Wt. % | Pigment/ | Shock Resistance With Lucidene ™ 395 | | Tinting Strength | | % Color Strength |
|---|---|---|---|---|---|---|
| Pigment Loading | Dispersant Ratio | Rating | Density of flocs | Visual Rating | % App. Str. | at max. abs. of 440 nm. |
| 36.3 | 6/1 | V. good | Trace–v. low | Excellent | 111.6 | 112.6 |
| 33.1 | 4/1 | Exc. | None | Very Good | 94.6 | 94.9 |

The pigment dispersions and inks of Example 14 with various pigments all performed well.

What is claimed is:

1. A pigment dispersant comprising

80–97% by weight, based on the weight of said pigment dispersant, of a first polymer comprising as copolymerized units 15–75% by weight, based on said first polymer weight, ethylenically unsaturated carboxylic acid-functional monomer, said polymer having a Mw from 4,000 to 16,000, and said polymer having a Tg greater than 70° C.; and 3–20% by weight, based on the weight of said pigment dispersant, of a poly(ethylene oxide/propylene oxide) block second polymer having an Mw from 3,000 to 20,000 and an HLB value of 16 to 32.

2. A method for dispersing a pigment in an aqueous medium comprising admixing an aqueous medium; a pigment; and 1–50% by weight, based on dry pigment weight, of the pigment dispersant of claim 1 and subjecting said admixture to shear for a time sufficient to disperse said pigment.

3. A pigment dispersion comprising a pigment dispersed in an aqueous medium and

1–50% by weight, based on dry pigment weight, of the pigment dispersant of claim 1.

4. An aqueous ink comprising the pigment dispersion of claim 3.

* * * * *